United States Patent
Micalizzi et al.

(10) Patent No.: US 8,387,073 B1
(45) Date of Patent: Feb. 26, 2013

(54) METHOD AND SYSTEM FOR PROCESSING NETWORK PACKETS

(75) Inventors: Charles Micalizzi, Capistrano Beach, CA (US); Stephen J. Chan, Roseville, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1460 days.

(21) Appl. No.: 11/742,282

(22) Filed: Apr. 30, 2007

Related U.S. Application Data

(60) Provisional application No. 60/896,784, filed on Mar. 23, 2007.

(51) Int. Cl.
G06F 9/44 (2006.01)
G06F 15/16 (2006.01)
(52) U.S. Cl. ........................ 719/326; 709/227
(58) Field of Classification Search ................... 719/326
See application file for complete search history.

(56) References Cited

U.S. PATENT DOCUMENTS

| 7,555,562 B2* | 6/2009 | See et al. ............. 709/240 |
|---|---|---|
| 2005/0131986 A1* | 6/2005 | Haagens et al. ........ 709/201 |
| 2006/0013253 A1* | 1/2006 | Hufferd ................. 370/466 |
| 2006/0015655 A1* | 1/2006 | Zur et al. ................ 710/5 |
| 2006/0047904 A1* | 3/2006 | Rohde et al. ........... 711/114 |
| 2007/0124407 A1* | 5/2007 | Weber et al. ........... 709/212 |

* cited by examiner

*Primary Examiner* — Andy Ho
*Assistant Examiner* — Abdou Seye
(74) *Attorney, Agent, or Firm* — Klein, O'Neill & Singh, LLP

(57) ABSTRACT

Method and system for transferring information from a host system is provided. The method includes sending a SCSI read command and a scatter/gather ("S/G") list from an application executed by a processor for the host system to a iSCSI software layer executed by the processor for the host system; generating an iSCSI protocol data unit ("PDU") header for a iSCSI PDU for the SCSI read command; sending the iSCSI PDU to a data mover layer executed by the processor for the host system; and sending the iSCSI PDU to an iSCSI offload module in a network adapter operationally coupled to the host system; wherein the iSCSI offload module appends a PDU header digest to the iSCSI PDU header; and transmits the PDU to a PDU destination.

8 Claims, 5 Drawing Sheets

METHOD AND SYSTEM FOR PROCESSING NETWORK PACKETS

CROSS REFERENCE TO RELATED APPLICATIONS

This application claims priority to U.S. provisional patent application Ser. No. 60/896,784, filed on Mar. 23, 2007, the disclosure of which is incorporated herein by reference in its entirety.

FIELD OF THE INVENTION

The present invention relates to network systems, and more particularly, to offloading host system tasks for managing network related operations.

BACKGROUND OF THE INVENTION

Computer networks are commonly used today in various applications. Computer networks typically use a layered protocol structure to manage network traffic. One common model that is typically used is the ISO model that includes a physical layer, a data link layer that includes a MAC layer, a network layer and others. Upper level protocol layers (ULPs) (for example, iSCSI and RDMA) interface with a network layer to send and receive data from the network.

As iSCSI, an upper layer protocol, becomes popular various software solutions to execute the iSCSI layer in software are emerging. Host system software typically executes the iSCSI layer in software. However, this process is slow and can consume host processor time and resources, especially for generating digests and checking cyclic redundancy code (CRC).

Operating systems, for example, Microsoft Chimney support offloading of TCP/IP protocol stack, but do not address digest and data copy problems. Typical iSCSI host bus adapters (HBAs) that offload iSCSI layer functionality from a host system to the HBA do not interface very well with host system software based iSCSI solutions. Therefore, there is a need for an efficient method and system for offloading iSCSI functionality in general and more specifically, offloading digest processing, data copy operations, and large PDU transmission.

SUMMARY

In one embodiment, a method for transferring information from a host system is provided. The method includes sending a SCSI read command and a scatter/gather ("S/G") list from an application executed by a processor for the host system to a iSCSI software layer executed by the processor for the host system; generating an iSCSI protocol data unit ("PDU") header for a iSCSI PDU for the SCSI read command; sending the iSCSI PDU to a data mover layer executed by the processor for the host system; and sending the iSCSI PDU to an iSCSI offload module in a network adapter operationally coupled to the host system; wherein the iSCSI offload module appends a PDU header digest to the iSCSI PDU header; and transmits the PDU to a PDU destination.

In another embodiment, a method for a network adapter operationally coupled to a host system and a network is provided. The method includes receiving network data from a networked device; forwarding the network data to an iSCSI offload module for the network adapter; validating a digest for the network data, wherein the iSCSI offload module validates the digest; sending the network data and a PDU header to a iSCSI layer executed by a processor for the host system; and sending network data to a storage layer, wherein the iSCSI layer sends the network data to the storage layer executed by the processor for the host system.

In yet another embodiment, a method for a network adapter operationally coupled to a host system and a network is provided. The method includes receiving a marker protocol data unit aligned (MPA) frame at a remote direct memory access (RDMA) offload module of the network adapter; verifying cyclic redundancy code (CRC) for the MPA frame, wherein the RDMA offload module verifies the CRC; copying data to a scatter/gather ("S/G") list; sending data and status to a iSCSI layer via an application programming interface and a data mover layer; and forwarding the data to an application layer executed by a processor for the host system.

In another embodiment, a system for processing network data is provided. The system includes a processor for a host system executing an application layer for sending a SCSI read command; and executing an iSCSI layer for generating an iSCSI protocol data unit ("PDU") header for the SCSI read command; and a network adapter with an iSCSI offloading module that receives the iSCSI PDU and appends a PDU header digest before transmitting the iSCSI PDU to a PDU destination.

This brief summary has been provided so that the nature of the invention may be understood quickly. A more complete understanding of the invention can be obtained by reference to the following detailed description of the various embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION

To facilitate an understanding of the various embodiments, a top-level description of common network protocols/standards and the general architecture/operation of a host system will be described. The specific architecture and operation of the various embodiments will then be described with reference to the general architecture.

Figure 1A:
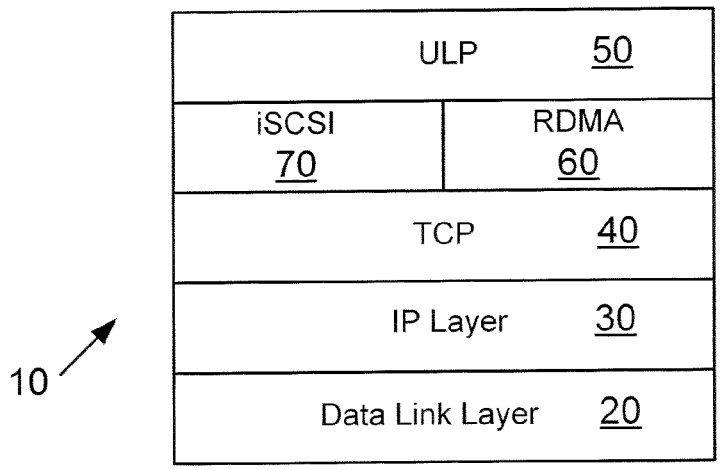
FIG. 1A shows an example of various protocol layers in a networking system.

Computing systems and devices use various protocols/standards for network communication. FIG. 1A shows an example of various protocol layers (10) that are used in networking systems. Data link layer (which includes the MAC layer) 20 interfaces with an IP (Internet Protocol) layer 30. TCP (Transmission Control Protocol) layer 40 typically sits on top of the IP layer. Upper Layer Protocols (ULPs) 50 may include plural layers, for example, the iSCSI layer 70, the RDMA layer 60 and others. The following provides a brief introduction to some of the standards/protocols:

Transmission Control Protocol/Internet Protocol ("TCP/IP"): TCP (40) is a standard network protocol (incorporated herein by reference in its entirety) that provides connection-oriented, reliable, byte stream service. This means that two nodes establish a logical connection before sending data and TCP maintains state information regarding the data transfer. Reliable means that data is delivered in the same order that it was sent. A byte stream service means that TCP views data to be sent as a continuous data stream that is sent in any way it sees fit and delivers it to the remote node as a byte stream.

The IP (30) standard protocol (incorporated herein by reference in its entirety) provides a datagram service whose function is to enable routing of data through various network subnets. Each of these subnets could be a different physical link such as Ethernet, ATM, or others. IP is also responsible for fragmentation of the transmit data to match a local link's maximum transmission unit (MTU). IP can fragment data at the source node or at any intervening router between the source and destination node.

A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series that is incorporated herein by reference in its entirety.

iSCSI Protocol: Internet SCSI (iSCSI) as defined by the Internet Engineering Task Force (IETF) maps the standard SCSI protocol on top of the TCP/IP protocol. iSCSI (incorporated herein by reference in its entirety) is based on the Small Computer Systems Interface ("SCSI") standard, which enables host computer systems to perform block data input/output ("I/O") operations with a variety of peripheral devices including disk and tape devices, optical storage devices, as well as printers and scanners. The iSCSI and TCP/IP protocol suite consist of 4 protocol layers; the application layer (of which iSCSI is one application), the transport layer (TCP), the network layer (IP) and the link layer (i.e. Ethernet).

A traditional SCSI connection between a host system and peripheral device is through parallel cabling and is limited by distance and device support constraints. For storage applications, iSCSI was developed to take advantage of network architectures based on Ethernet standards. iSCSI leverages the SCSI protocol over established networked infrastructures and defines the means for enabling block storage applications over TCP.

The iSCSI architecture is based on a client/server model. Typically, the client is a host system such as a file server that issues a read or write command. The server may be a disk array that responds to the client request. Typically, the client is an initiator that initiates a read or write command and a disk array is a target that accepts a read or write command and performs the requested operation.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target.

Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in the target process commands. Commands are sent by the host system in Command Descriptor Blocks ("CDR"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

RDMA: Remote Direct Memory Access (RDMA) is a standard upper layer protocol (incorporated herein by reference in its entirety) that assists one computer to directly place information in another computer's memory with minimal demands on memory bus bandwidth and CPU processing overhead. RDMA over TCP/IP defines the interoperable protocols to support RDMA operations over standard TCP/IP networks. A network interface card (or adapter) that can off-load TCP/IP protocol processing and support RDMA over TCP/IP may be referred to as an RNIC.

Markers, Data Integrity Fields ("DIFs") and Digests:

Embedded in a stream of iSCSI or RDMA data, there are three fields, which may need to be located for processing by a receiving network node. These fields are referred to as: Markers, DIFs, and Digests. Each of these fields may or may not be present in a data stream regardless of the presence of the other fields. The location of each field in a data stream is unrelated, but can have an affect on locating other fields.

Markers:

Markers are inserted into a data stream periodically at a predetermined interval, starting at a given TCP sequence number. Markers are a fixed length, and indicate the offset to the start of the next protocol data unit ("PDU"). iSCSI markers are 8 bytes long, while RDMA markers are 4 bytes long. Insertion of iSCSI markers into the data stream is performed (logically) after insertion of digests and/or DIFs. Thus, iSCSI markers are not included in the Cyclic Redundancy Check (CRC) calculation for either of those fields.

RDMA markers are inserted into a data stream (logically) after the insertion of DIFs, but prior to insertion of Digests. Thus, RDMA markers are not included in the calculation of the DIF CRC, but are included in the Digest CRC calculation.

DIFs:

DIFs are 8-byte fields appended to each block of data stored on a mass storage device. A DIF contains a Reference Tag, Application Tag, and a CRC value. As a direct memory access (DMA) occurs, the CRC is determined for each DIF on each data block during a transfer. Depending on the application in a system, an incoming data stream may need to insert DIFs periodically into the data stream, validate and remove them from the data stream, or validate them and keep them in the data stream.

DIFs are included in the Digest calculation for both iSCSI and RDMA. Markers are not included in the iSCSI Digest calculation, but are included in the RDMA Digest calculation.

iSCSI Digests:

iSCSI Data Digests are 4-byte fields appended to the end of an iSCSI PDU, which are a CRC calculation over the data portion of the PDU. iSCSI Header Digests are 4-byte fields appended to the end of a 48-byte iSCSI PDH Header, which are a CRC calculation over the header portion of the PDU.

Figure 1B:
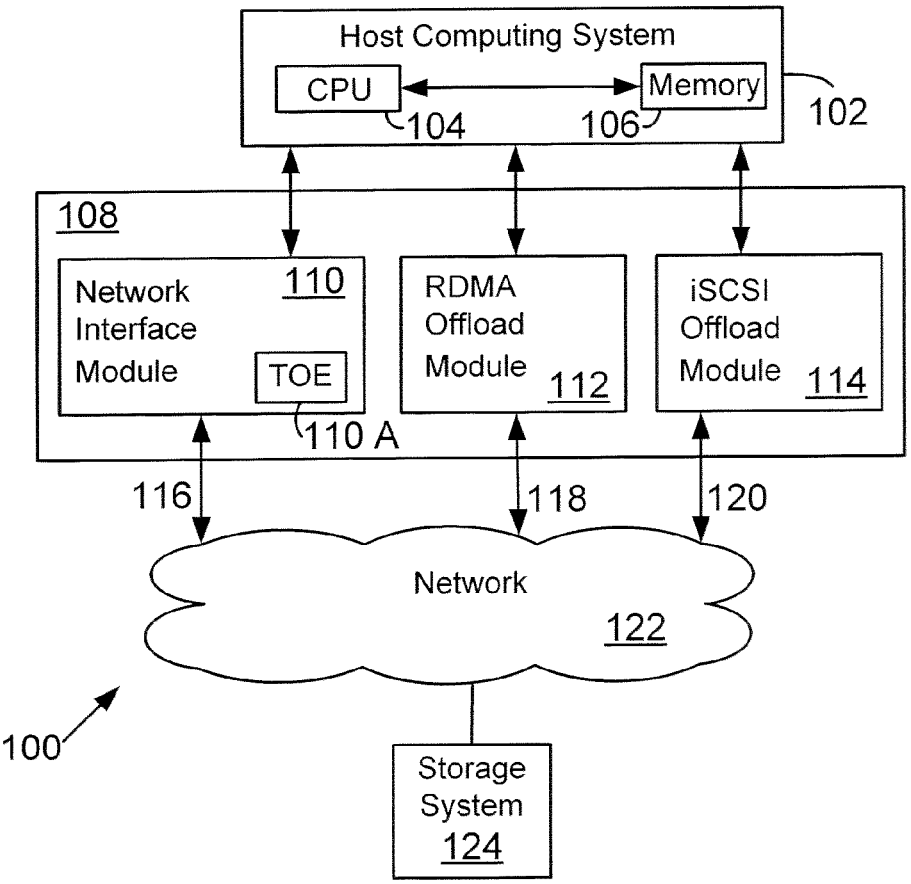
FIG. 1B shows a networking system, according to one embodiment.

Network System:

FIG. 1B shows an example of a networking system 100, used according to one embodiment. System 100 includes a computing system 102, which typically includes several functional components. These components may include a central processing unit (CPU) 104, host memory (or main/ system memory) 106, input/output ("I/O") devices (not shown), read only memory (not shown), and other components.

Host memory 106 is coupled to CPU 104 via a system bus or a local memory bus (not shown). Host memory 106 is used to provide CPU 104 access to data and program information that is stored in host memory 106 at execution time. Typically, host memory 106 is composed of random access memory (RAM) circuits. A computing system with the CPU and main memory is often referred to as a host system.

System 100 includes an adapter 108, which can be used for both initiator and target applications (i.e. can be used on a host bus adapter or with a redundant array of inexpensive disks ("RAID") controller). Adapter 108 may be on a PCI development board with a Field Programmable gate Array ("FPGA"). The chip may also be integrated into an Application Specific Integrated Circuit ("ASIC") with an embedded serialize/de-serializer ("SERDES") (not shown) and internal programmable random access memory ("RAM").

Adapter 108 includes plural modules, including a network interface module 110, a RDMA offload module 112 and an iSCSI offload module 114. Network interface module 110 operates as a network adapter to connect host system 100 to another networked device (for example, storage system 124) via a network connection 116 and network 122. Network Interface module 110 includes a TCP/IP accelerator module (or "chip" or "system" or "engine") (TOE) 110A that executes the TCP/IP protocol stack in hardware, instead of software at host 102. TOE 110A includes an embedded Ethernet MAC, to connect a PCI based host to a LAN (not shown). Details of a TOE device are provided in U.S. Pat. No. 7,403,542, assigned to QLogic Coporation, incorporated herein by reference in its entirety.

RDMA offload module 112 executes the RDMA protocol functionality and is coupled to network 122 via link 118. iSCSI offload module 114 coupled to network 122 via link 120 executes the specific functions of the iSCSI layer in adapter 108, and specifically performs digest processing, data copy offload, and large PDU transmission offload, instead of the software layer in host system 102.

Figure 1C:
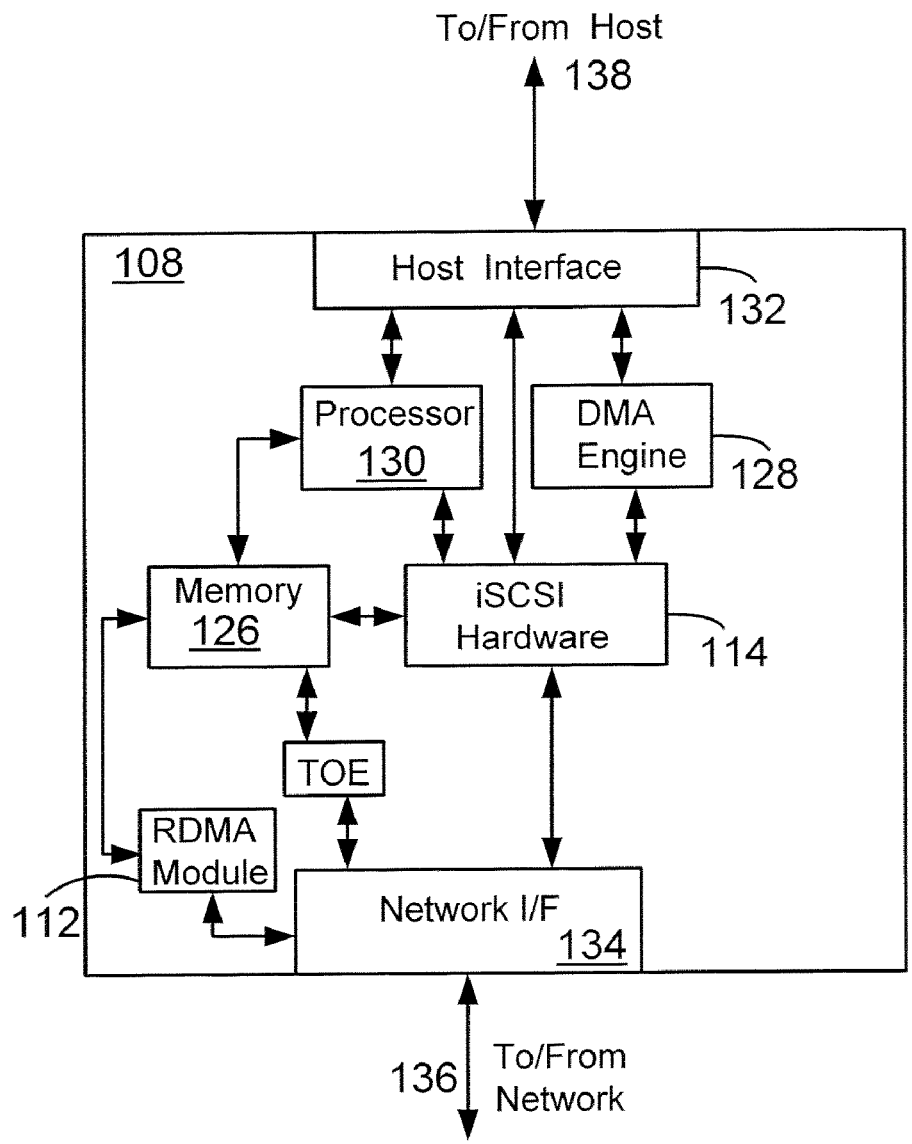
FIG. 1C shows a top-level block diagram of a host bus adapter interfacing with a host system, according to an embodiment.

FIG. 1C shows a block diagram for adapter 108 interfacing with a host system via link (for example, a PCI bus) 138 and host interface 132. Adapter 108 interfaces with a network via link 136 and network interface 134. Network interface 134 may be a part of network interface module 110 (FIG. 1C).

Adapter 108 includes iSCSI hardware 114 for processing digests, performing data copy offload and large PDU transmission offload operations. Hardware 114 may include a dedicated processor or state machine to accomplish this purpose.

Adapter 108 may include processor 130 that has access to adapter memory 126. Processor 130 controls overall adapter 108 functionality by executing firmware instructions from memory 126.

DMA engine 128 is used to perform direct memory access functions in sending data to and receiving data from the host.

Figure 1D:
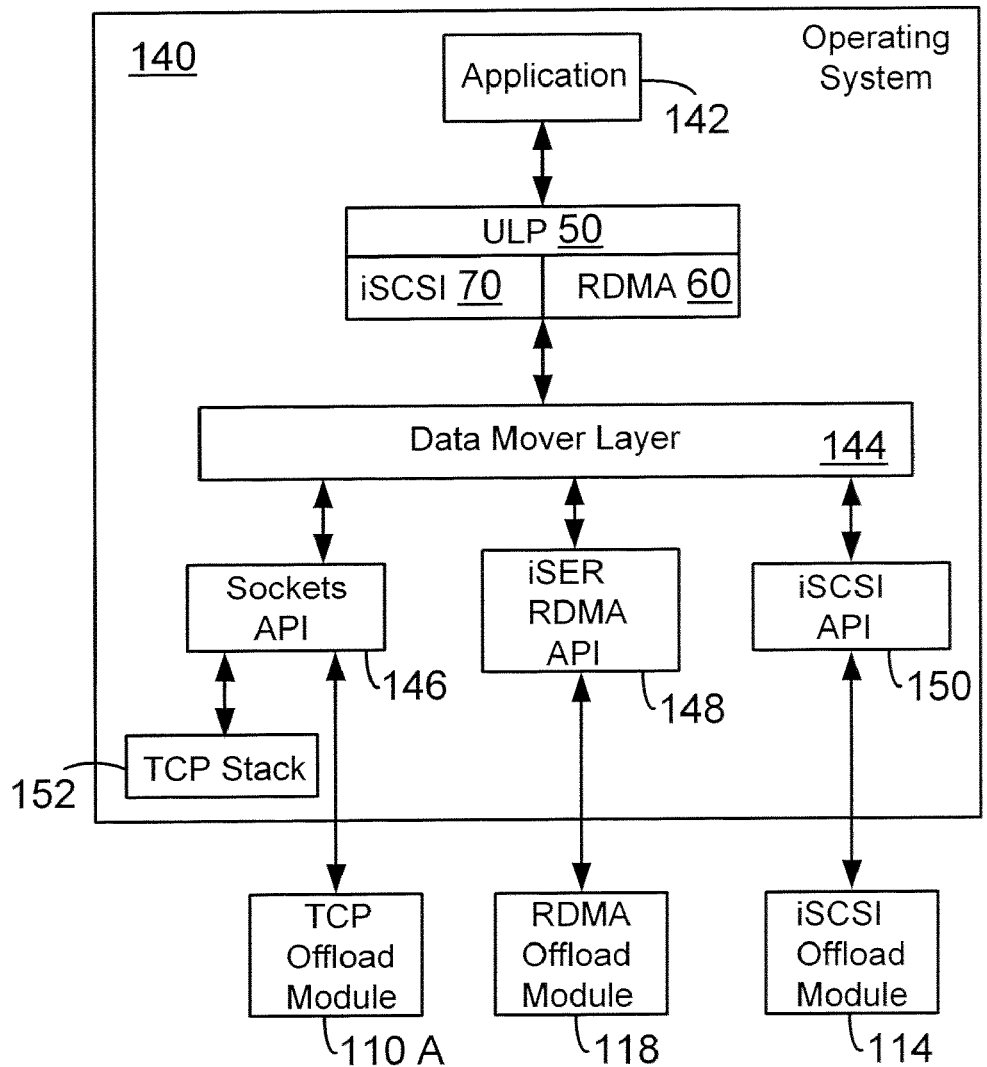
FIG. 1D shows a block diagram of software architecture of an operating system, according to an embodiment.

FIG. 1D shows a block diagram of software architecture for implementing the various embodiments disclosed herein. CPU 104 executes operating system 140 in host system 102. Application (may also be referred to as storage layer) 142 is executed in host system 102. Application 142 can send read and write requests via iSCSI layer 70. ULP 50 interfaces with a data mover layer 144 send and receive application 142 generated commands.

An industry standard organization (RDMA consortium) developed data mover layer 144 that allows an iSCSI layer (70) to utilize the RDMA transport (commonly known as iSER) to send iSCSI commands. In one embodiment, iSCSI offload module 114 interfaces with data mover layer 144 via an iSCSI application-programming interface (API) 150. A standard data mover layer 144 does not typically interface with an iSCSI API 150.

iSCSI offload module (or engine) 114 performs various functions to offload execution of iSCSI layer in host software. For example, iSCSI offload module 114 performs Digest calculations and also assists in sending large data packets. For example, if there is a request to send 4 megabytes of data and adapter 108 has negotiated a PDU size of 8K, then 512 PDUs are needed to send 4 MB of data. The host system 102 sends a header for the first PDU and iSCSI offload module 114 replicates the headers for the other 511 PDUs. This will save CPU 104 processing time.

iSCSI offload module 114 also assists in processing "Immediate Data" as defined by the iSCSI standard and with solicited and unsolicited data. Some SCSI commands require additional parameter data to accompany the SCSI command. Immediate Data may be placed beyond the boundary of the iSCSI header in a data segment. Alternatively, user data (e.g., from a WRITE operation) can be placed in the data segment (both cases are referred to as Immediate Data).

Outgoing SCSI data (initiator to target user data or command parameters) is sent as either solicited data or unsolicited data. Solicited data are sent in response to a response to target (R2T) PDUs. Unsolicited data can be sent as part of an iSCSI command PDU (Immediate Data) or in separate iSCSI data PDUs.

Immediate data are assumed to originate at an offset 0 in an initiator SCSI write-buffer (outgoing data buffer) (not shown). All other Data PDUs have a buffer offset set explicitly in the PDU header.

FIG. 1D also shows an iSER API 148 for handling RDMA packets. API 148 interfaces with RDMA offload module 112.

Sockets API 146 interfaces with TOE 110A and a TCP/IP stack 152. Sockets API 146 assists in establishing a network connection.

It is noteworthy that for clarity sake, various components, for example, TOE 110A, RDMA offload module 114 and iSCSI module 114 have been shown as separate components. These modules can be all integrated into a single module to implement the functionality of the various embodiments disclosed herein.

Figure 2:
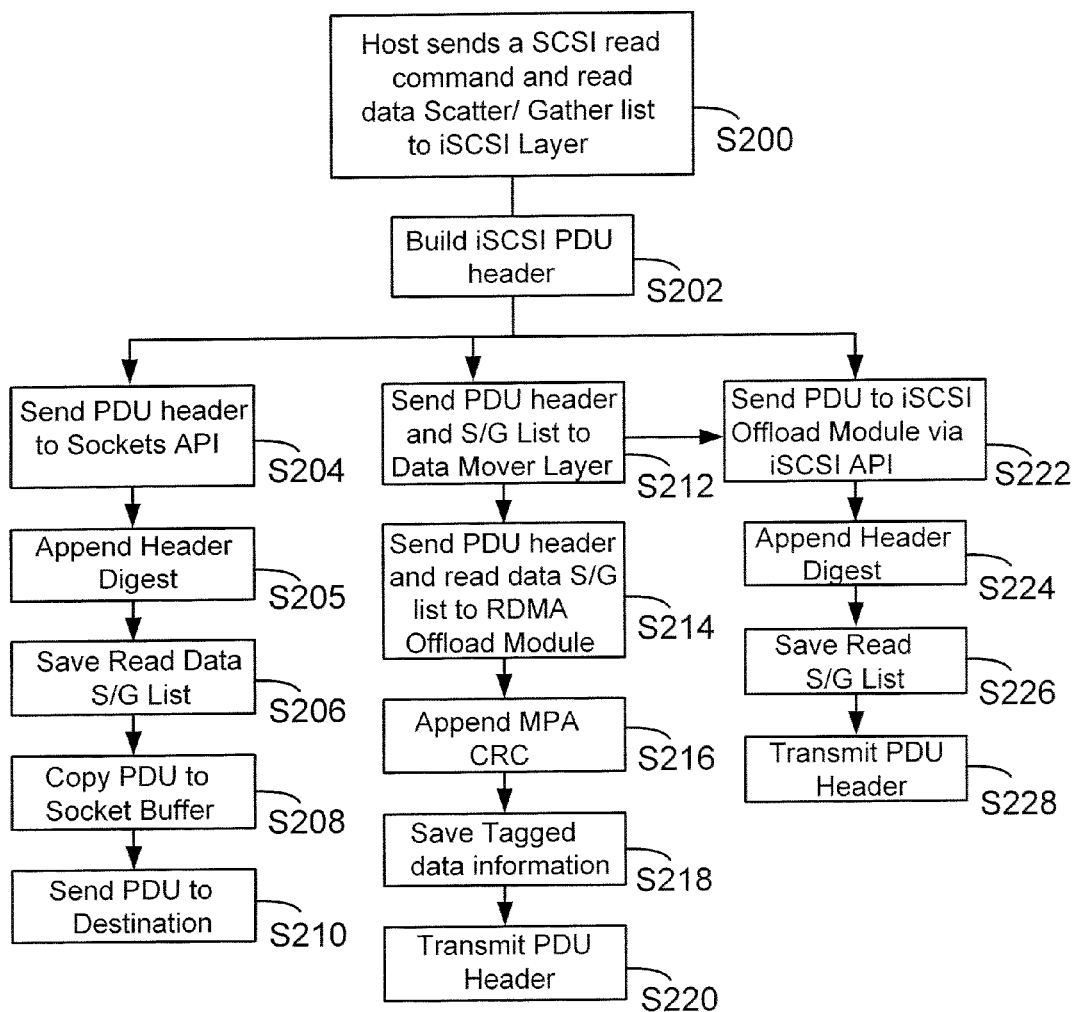
FIG. 2 shows a process flow diagram for processing a read request.

Process Flow:

FIG. 2 shows a process flow diagram for processing a read request, according to one embodiment. The process starts in step S200, when host system 102 sends a SCSI read command and a Scatter/Gather (S/G) list to iSCSI layer 70. Application 142 may send the read command.

In step S202, iSCSI layer 70 builds an iSCSI PDU header for the read command. The PDU is then sent to data mover layer 144, which can process the PDU in three different paths; steps S204 to S210 (via sockets API 146); steps S212 to S220 (via iSER RDMA API 148) and steps S222 to S228 (via iSCSI API 150) that are described below.

In step S204, the PDU header is sent to sockets API 146, which appends the header digest in step S205. In step S206, the read data S/G list is saved. In step S208, the PDU is copied in a socket buffer located in a memory managed by a sockets layer before being sent to adapter 108. Thereafter, the PDU is sent in step S210 via adapter 108.

In step S212, iSCSI layer 70 sends the PDU header and S/G list to data mover layer 144. In step S214, this information is passed to iSER RDMA layer 148.

In step S216, RDMA offload module 118 appends MPA (Marker PDU Aligned) frame for TCP CRC. In step S218, tagged information is stored and the PDU header is transmitted in step S220.

In step S222, data mover 144 sends the PDU to iSCSI offload module 114.

In step S224, iSCSI offload module 114 appends PDU header digests; and in step S226, saves the S/G list. The PDU is transmitted in step S228 by iSCSI Module 114.

Figure 3:
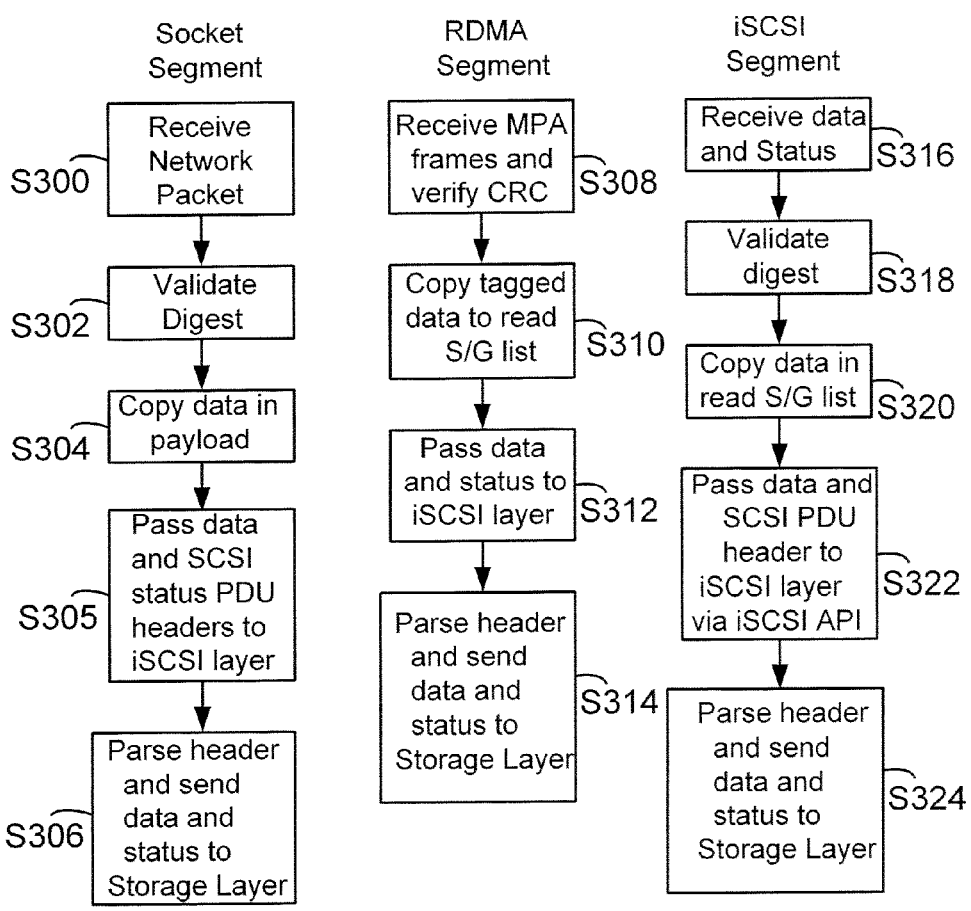
FIG. 3 shows a process flow diagram for receiving network data, according to one embodiment.

FIG. 3 shows a process flow diagram for receiving network data, according to one embodiment. The process flow has been divided into three stages, depending on the type of traffic, i.e. steps S300-S306 handle data and commands via sockets API 149; steps S308 and S314 handle data and commands via iSER RDMA module 114 and iSER RDMA API 148; and steps S316-S324 handle data and commands via iSCSI offload module 114 and iSCSI API 150.

In step S300, a network packet for the socket segment is received. TOE 110A validates the digest in step S302 and data in the payload is copied in step S304. In step S305, data and SCSI status PDU headers are passed to iSCSI layer 70. In step S306, the header is parsed and data and status is passed on to application layer 142 (for example, a SCSI layer).

In step S308, MPA frames are received by RDMA offload module 114 and the CRC is verified by RDMA offload module 114. In step S310, tagged data are copied to a S/G list by RDMA offload module 114. Tagged data is data received in an RDMA PDU, which has a direct data placement (DDP) "tagged" flag set. The DDP header includes a steering tag, which identifies a memory buffer where data is to be placed directly for a particular buffer (i.e. a named buffer). Untagged data typically do not have any particular data buffer and are saved in an unnamed buffer, i.e. a memory buffer from among a plurality of buffers.

In step S312, data and status (with PDU headers) are passed to iSCSI layer 70 via iSER RDMA API 148 and Data mover layer 144. Thereafter, in step S314, the header is parsed and data is sent to application 142.

In step S316, iSCSI offload module 114 receives data and status. iSCSI module 114 validates the digest in step S318. In step S320, data is copied to S/G list. In step S322, data and the SCSI PDU is passed to iSCSI layer 70 via iSCSI API 150. Thereafter, in step S324, iSCSI layer 70 parses the PDU header and data and status is sent to storage layer 142.

Although the present invention has been described with reference to specific embodiments, these embodiments are illustrative only and not limiting. Many other applications and embodiments of the present invention will be apparent in light of this disclosure and the following claims.

What is claimed is:

1. A method for transferring information from a computing device, comprising:
sending a SCSI read command and a scatter/gather ("S/G") list from an application executed by a processor for the computing device to a iSCSI software layer executed by the processor for the computing device;
generating an iSCSI protocol data unit ("PDU") header for a iSCSI PDU for the SCSI read command;
sending the iSCSI PDU to a data mover layer executed by the processor for the computing device; and
sending the iSCSI PDU to an iSCSI offload module in a network adapter operationally coupled to the computing device;
wherein the iSCSI offload module appends a PDU header digest to the iSCSI PDU header, and transmits the iSCSI PDU to a destination;
wherein the iSCSI offload module replicates the iSCSI PDU header for transmitting additional iSCSI PDUs to the destination; and
wherein the iSCSI offload module interfaces with the data mover layer through an iSCSI application programming interface (API) layer, receives a network data and a status from the network adapter, and validates the PDU header digest; copies the network data to the S/G list and passes the network data and SCSI PDU headers to the iSCSI (API) layer via the iSCSI application-programming interface (API); the iSCSI (API) layer parsing the SCSI PDU headers; and sending the network data and the status to a storage layer.

2. The method of claim 1, further comprising:
sending a PDU and a S/G list to an RDMA offload module in the network adapter;
appending a marker PDU Aligned (MPA) framing field for cyclic redundancy code (CRC); and
transmitting the PDU from the RDMA offload module to the destination.

3. The method of claim 2, wherein the RDMA offload module interfaces with the data mover layer via an application programming interface.

4. A system for processing network data comprising:
a processor for a computing device executing an application layer for sending a SCSI read command; and executing an iSCSI software layer for generating an iSCSI protocol data unit ("PDU") header for an iSCSI PDU for the SCSI read command; and
a network adapter with an iSCSI offloading module that receives the iSCSI PDU and appends a PDU header digest to the iSCSI PDU header before transmitting the iSCSI PDU to a destination;
wherein the iSCSI offload module replicates the iSCSI PDU header for transmitting additional iSCSI PDUs to the destination; and
wherein the iSCSI offload module interfaces with a data mover layer that is executed by the processor for the computing device via an iSCSI API layer also executed by the processor for the computing device,
wherein the iSCSI offload module receives a network data and a status from the network adapter, validates the PDU header digest, copies the network data to the S/G list, and passes the network data and SCSI PDU headers to the iSCSI API layer via the iSCSI application-programming interface (API);
wherein the iSCSI API layer parses the SCSI PDU headers; and sends the network data and the status to a storage layer.

5. The system of claim 4, wherein the data mover layer receives the iSCSI PDU from the iSCSI software layer and sends the iSCSI PDU to the iSCSI offload module.

6. The system of claim 4, further comprising:
an RDMA offload module for the network adapter that receives a marker PDU Aligned (MPA) frame and appends a marker PDU Aligned (MPA) framing field for cyclic redundancy code (CRC).

7. The system of claim 6, wherein the RDMA offload module interfaces with a data mover layer via an application programming interface to receive the MPA frame from the computing device.

8. The system of claim 6, wherein the RDMA offload module receives a marker protocol data unit aligned (MPA) frame from a networked device and verifies a cyclic redundancy code (CRC) for the MPA frame before sending the MPA frame to the iSCSI API layer via an application programming interface and a data mover layer.

* * * * *

UNITED STATES PATENT AND TRADEMARK OFFICE
CERTIFICATE OF CORRECTION

PATENT NO. : 8,387,073 B1
APPLICATION NO. : 11/742282
DATED : February 26, 2013
INVENTOR(S) : Charles Micalizzi et al.

It is certified that error appears in the above-identified patent and that said Letters Patent is hereby corrected as shown below:

In the Specification

In column 4, line 3, delete "("CDR")." and insert -- ("CDB"). --, therefor.

Signed and Sealed this
Twentieth Day of August, 2013

Teresa Stanek Rea
*Acting Director of the United States Patent and Trademark Office*